Figure 1:
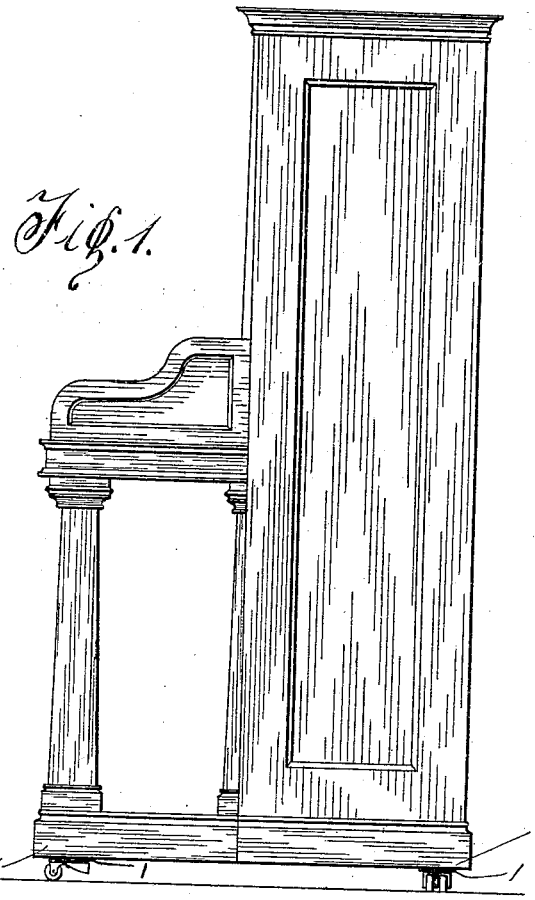

I. L. LEASURE.
CASTER.
APPLICATION FILED MAY 14, 1909.

930,199.

Patented Aug. 3, 1909.

Witnesses

Inventor
I. L. Leasure
By
Attorneys

UNITED STATES PATENT OFFICE.

IRA LESSUP LEASURE, OF TEMPLETON, PENNSYLVANIA, ASSIGNOR OF ONE-HALF TO FRIEND M. LEASURE, OF TEMPLETON, PENNSYLVANIA.

CASTER.

No. 930,199.      Specification of Letters Patent.      Patented Aug. 3, 1909.

Application filed May 14, 1909. Serial No. 495,934.

*To all whom it may concern:*

Be it known that I, IRA LESSUP LEASURE, a citizen of the United States of America, residing at Templeton, in the county of Armstrong and State of Pennsylvania, have invented certain new and useful Improvements in Casters, of which the following is a specification, reference being had therein to the accompanying drawing.

This invention relates to casters, particularly designed for pianos and other large and heavy structures.

The invention has for its object to provide a novel roller bearing in connection with the caster, whereby a piano or similar structure can be moved in a horizontal plane relative to said caster, thus facilitating the shifting of a piano upon a floor.

I attain the above object by providing a simple, durable and inexpensive caster that can be easily secured to a piano or similar structure, and the mechanical construction of the caster will be hereinafter described and claimed.

Reference will now be had to the drawing forming a part of this specification, wherein there is illustrated the preferred embodiment of my invention, but it is to be understood that the structural elements thereof can be varied or changed without departing from the spirit of the invention.

Figure 2:
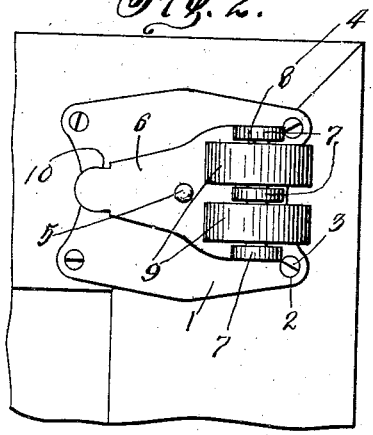
Figures 3, 4:
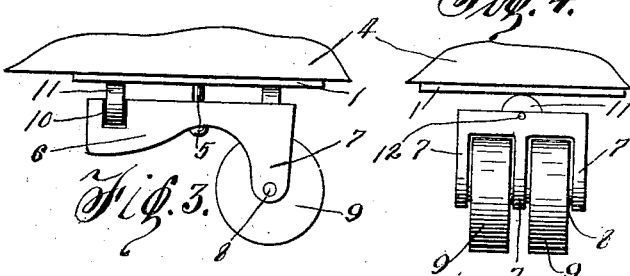
Figure 5:
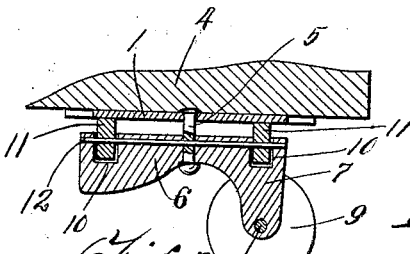

In the drawings:—Figure 1 is an end view of a piano provided with my casters, Fig. 2 is an enlarged bottom plan of the caster, Fig. 3 is a side elevation of the same, Fig. 4 is a front elevation of the caster, and Fig. 5 is a longitudinal sectional view of the caster.

In the accompanying drawings, 1 denotes a plate substantially rectangular in plan, and having openings 2 for screws 3 or similar fastening means employed for securing the plate to the bottom of a piano 4 or a similar structure.

5 denotes a post revolubly supported centrally of the plate 1, and mounted upon the depending end of said post is a caster body 6, substantially triangular in plan. This caster body at one end thereof is provided with yoke arms 7 for a transverse pin 8, and revolubly mounted upon said pin between the arms 7 are wheels or rollers 9, preferably one wheel or roller between each pair of arms.

The ends of the caster body are provided with recesses or pits 10 for rollers 11 adapted to engage the under face of the plate 1. The rollers 11 are supported by a longitudinal pin 12 extending through the body 6 and the recesses 10 thereof, said pin also extending through the post 5 and holding said post relative to the caster body.

With the piano 4 equipped with four casters, it is apparent that either of the wheels 9 at either corner of the piano will serve functionally as a pivot, while the other casters are swung around in a horizontal plane, thus facilitating the shifting of a heavy object, as a piano upon a floor. The caster is compact and when located inwardly from the lower edges of the piano cannot be easily observed.

Having now described my invention what I claim as new, is:—

A caster of the class described, comprising a plate, a revoluble post carried by said plate, a caster body mounted upon the lower end of said post and provided in the upper face with recesses, yoke arms carried by said body at one end thereof, caster wheels mounted between said arms, a pin extending longitudinally through said body and recesses and through said post, and rollers revolubly mounted upon said pin within said recesses and projecting above said body and engaging said plate, substantially as described.

In testimony whereof I affix my signature in the presence of two witnesses.

IRA LESSUP LEASURE.

Witnesses:
     CLOOD B. BRISON,
     DAVID N. BRISON.